US012184175B2

(12) United States Patent
Tornila Oliver

(10) Patent No.: US 12,184,175 B2
(45) Date of Patent: Dec. 31, 2024

(54) VOLTAGE REGULATOR WITH BOOST CURRENT CONTROL CIRCUITRY

(71) Applicant: Shanghai DN Semiconductors Co., Ltd., Shanghai (CN)

(72) Inventor: Jaume Tornila Oliver, Eindhoven (NL)

(73) Assignee: SHANGHAI DN SEMICONDUCTORS CO., LTD., Shanghai (CN)

(*) Notice: Subject to any disclaimer, the term of this patent is extended or adjusted under 35 U.S.C. 154(b) by 234 days.

(21) Appl. No.: 18/055,913

(22) Filed: Nov. 16, 2022

(65) Prior Publication Data

US 2024/0162815 A1 May 16, 2024

(51) Int. Cl.
*H02M 3/156* (2006.01)
*H02M 1/00* (2006.01)
*H02M 3/158* (2006.01)

(52) U.S. Cl.
CPC ......... *H02M 3/158* (2013.01); *H02M 1/0009* (2021.05)

(58) Field of Classification Search
CPC .... H02M 3/158; H02M 3/156; H02M 1/0009; H02M 1/0003
See application file for complete search history.

(56) References Cited

U.S. PATENT DOCUMENTS

| 9,235,225 | B2 | 1/2016 | Price et al. | |
|---|---|---|---|---|
| 10,840,803 | B2* | 11/2020 | Toni | H02M 3/07 |
| 11,029,716 | B1* | 6/2021 | Chan | H02M 3/073 |
| 11,899,480 | B2* | 2/2024 | Tse | G05F 1/575 |
| 2012/0187927 | A1* | 7/2012 | Yu | G05F 1/575 323/271 |

OTHER PUBLICATIONS

Degrauwe, M., "Adaptive Biasing CMOS Amplifiers", IEEE Journal of Solid-State Circuits, vol. SC-17, No. 3, Jun. 1982.
Huang, B., "A Simple Slew Rate Enhancement Technique with Improved Linearity and Preserved Small Signal Performance", 2014 IEEE 57th International Midwest Symposium on Circuits and Systems (MWSCAS), Sep. 25, 2014.
Kwong, K., "Slew-Rate Enhancement Circuit of CMOS Current-Mirror Amplifier by Edge-Detecting Technique", 2010 IEEE International Conference of Electron Devices and Solid-State Circuits (EDSSC), Dec. 15-17, 2010.
Lee, H., "Design of Low-Power Analog Drivers Based on Slew-Rate Enhancement Circuits for CMOS Low-Dropout Regulators", IEEE Transactions on Circuits and Systems—II: Express Briefs, vol. 52, No. 9, Sep. 2005.

* cited by examiner

*Primary Examiner* — Adolf D Berhane
(74) *Attorney, Agent, or Firm* — Bayramoglu Law Offices LLC

(57) ABSTRACT

A voltage regulator with an amplifier for comparing a feedback voltage and a reference voltage. The output of the amplifier is adjusted based on the comparison to provide a regulated voltage at the regulator output. The regulator includes a current comparator that compares a current indicative of a current of the amplifier with a reference current to provide a signal used to enable a boost current circuit to provide boost current for the amplifier during a boost current event. The regulator includes current comparator control circuitry for providing improved performance of the current comparator in enabling and disabling the boost current to the amplifier.

20 Claims, 3 Drawing Sheets

VOLTAGE REGULATOR WITH BOOST CURRENT CONTROL CIRCUITRY

BACKGROUND OF THE INVENTION

Field of the Invention

This invention relates to a voltage regulator with boost current control circuitry.

Background

Voltage regulators are used to supply voltages within a desired voltage range. With some voltage regulators (e.g., with some low drop out regulators), a relatively fast change in load current can cause the voltage to momentarily drop, or otherwise be out of regulation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

Disclosed herein is a voltage regulator with an amplifier for comparing a feedback voltage and a reference voltage. The output of the amplifier is adjusted based on the comparison to provide a regulated voltage at the regulator output. The regulator includes a current comparator that compares a current indicative of a current of the amplifier with a reference current to provide a signal used to enable a boost current circuit to provide boost current for the amplifier during a boost current event. The regulator includes current comparator control circuitry for providing improved performance of the current comparator in enabling and disabling the boost current to the amplifier. In some embodiments, one feature of the current comparator control circuitry is a delay circuit that provides a delay in disabling the boost current circuit after a boost current event. In some embodiments, the current comparator control circuitry includes an assertion circuit for adjusting the voltage of the output of the current comparator to enable the boost current circuit for at least a time independent of the comparison of the currents.

In some embodiments providing a circuit with current comparator control circuitry with one or more such features may provide for an improved voltage regulator that more accurately regulates its output voltage in response to changing load conditions.

With some voltage regulators, a relatively fast change in load current can cause the voltage of the regulator to drop out of regulation. With some voltage regulators that include an amplifier for comparing a feedback voltage with a reference voltage, a sudden increase in load current may cause the output voltage to suddenly drop, which can cause a current of an amplifier to drop as well. This drop in amplifier load current may limit the response time of the amplifier in adjusting its output to increase the voltage of the regulator output to compensate for the voltage drop. Some regulators may provide for extra bias current to the amplifier in such conditions. However, with some regulators, implementation of this extra bias current to the amplifier may not be effective in keeping the voltage within regulation.

Figure 1:
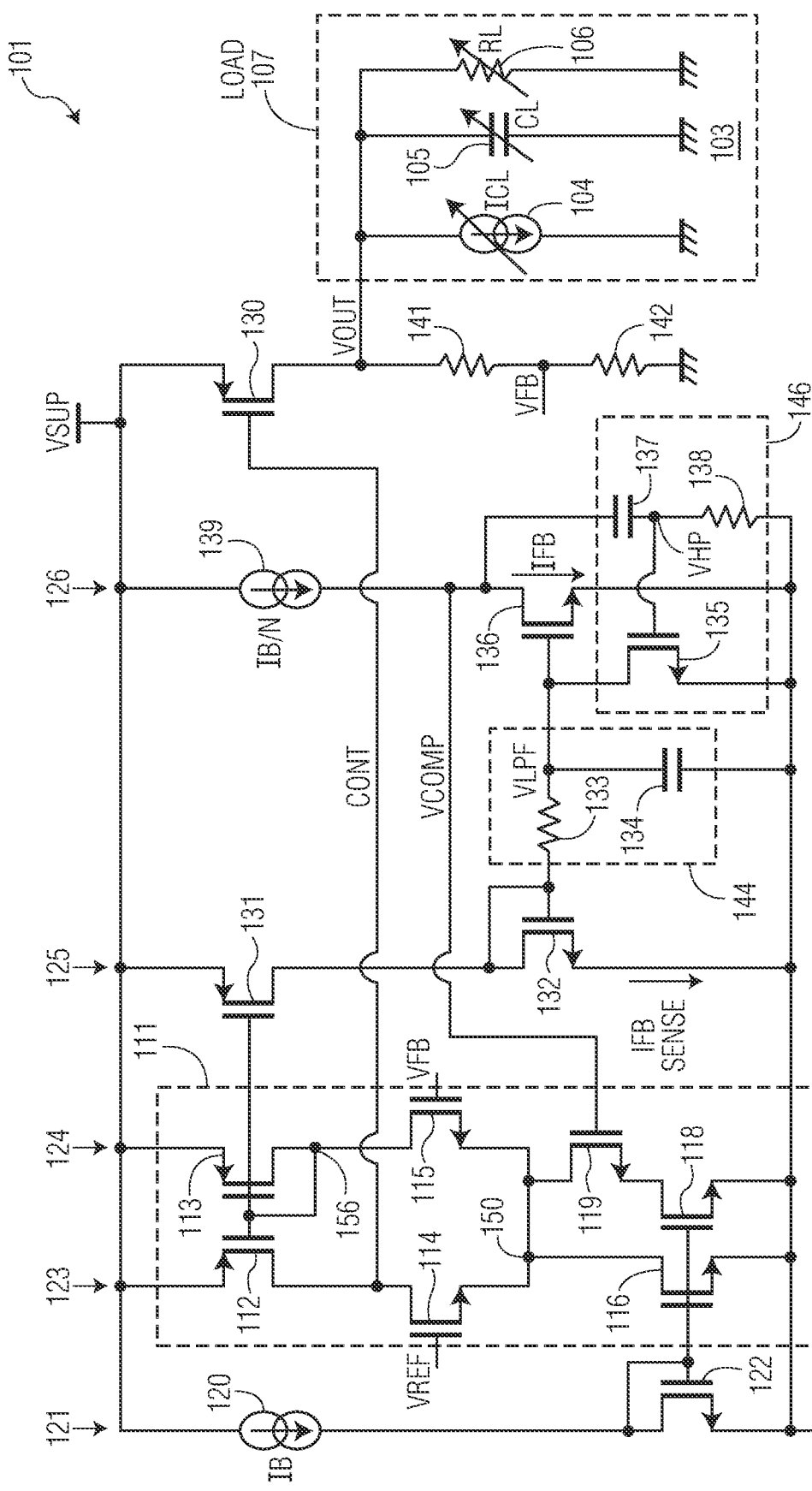
FIG. 1 is a circuit diagram of a voltage regulator and load circuitry according to one embodiment of the present invention.

FIG. 1 is a circuit diagram of a voltage regulator 101 and load circuitry 107 according to one embodiment of the present invention. In FIG. 1, voltage regulator 101 includes an output (VOUT) that provides a voltage to load circuitry 107 that is regulated to match a voltage as indicated by reference voltage VREG that is supplied from a voltage reference source (not shown). Voltage regulator 101 includes a power PFET 130 that includes a source connected to voltage supply terminal (VSUP) that supplies a supply voltage and a drain connected to VOUT. Regulator 101 also includes an amplifier 111 having one input that receives the reference voltage (VREF) and a second input that receives a feedback voltage (VFB) from a voltage divider of resistors 141 and 142. Feedback voltage VFB is a scaled voltage of VOUT and is indicative of the voltage of VOUT. Based on a comparison of VREF and VFB, amplifier 111 adjusts its output CONT to control the conductivity of power PFET 130 such the voltage of VFB matches the voltage of VREF.

As shown in FIG. 1, regulator 101 supplies power at a regulated voltage to load circuitry 107 for load circuitry 107 to perform its operations. In one embodiment, load circuitry 107 can include circuitry for electronic circuits such as processors, memories, sensors, controllers, analog circuits, communication circuits, mix signal circuits, or a combination of circuits. In one embodiment, load circuitry 107 may represent a voltage domain on an integrated circuit or may represent a system that includes multiple integrated circuits such as a computer system. In some embodiments, load circuitry 107 may supply power to other voltage regulators. In one embodiment, regulator 101 is on the same integrated circuit as load circuitry 107, but they may be on different integrated circuits in other embodiments. In some embodiments, regulator 101 may be implemented with multiple integrated circuits.

In the embodiment shown, load circuitry 107 is symbolically represented by a variable current source 104, a variable capacitance 105, and a variable resistance 106 to indicate that load circuitry 107 may pull a current that can vary, have a capacitance that can vary, and have a resistance that can vary during operation. For example, in some embodiments, all or portions of load circuitry 107 may transition to a different power state during operation. During such transitions, the current drawn by load circuitry 107 may increase or decrease relatively sharply, which may cause the voltage of VOUT to differ from the desired voltage indicated by VREF by more than a specified amount.

Amplifier 111 includes current paths 123 and 124 from supply terminal VSUP to node 150. Current path 123 flows through PFET 112 and NFET 114. Current path 124 flows through PFET 113 and NFET 115. The current of path 123 is controlled by PFET 112 and the current of path 124 is controlled by the conductivity of NFET 115. Under normal operations, the current through paths 123 and 124 is sunk through path 151 to the ground supply terminal. Path 151 includes NFET 116. NFET 116 is part of a current mirror with NFET 122 of current path 121 such that current source 120 of path 121 sets the amount of current (current IB) sunk by path 151. During normal operation, boost current path 152 is not enabled in that a switch (implemented as NFET 119) of path 152 is not conductive. When enabled, path 152 also sinks current IB (or a multiple of current IB in some embodiments) in that NFET 118 is in a current mirror configuration with NFET 122.

As stated above, during operation, the output of amplifier 111 (CONT) provides a voltage to control the conductivity of PFET 130 such that the voltage of VFB matches VREF. If the voltage of VFB increases above VREF, then NFET 115 becomes more conductive than NFET 114, which pulls more of the sunk current of path 151 through NFET 115, which pull node 156 lower to increase the conductivity of PFET 112 to pull the voltage of CONT higher. Raising the voltage of CONT higher causes power PFET 130 to being less conductive which increases the source-drain voltage drop of PFET 130 to lower the voltage of VOUT and VFB until the voltage of VFB equals the voltage of VREF.

Also during normal operation, If VOUT drops in voltage to where VFB is lower than VREF, then NFET 115 becomes less conductive which raises the voltage of node 156 such that the current flowing through PFET 112 is reduced. With the current through PFET 112 being reduced, the bias current through node 150 pulls the voltage of CONT lower through NFET 114. The voltage of CONT going lower makes power PFET 130 more conductive to decrease the source-drain voltage drop of PFET 130 and raise the voltage of VOUT until the voltage of VFB matches the voltage of VREF.

However, under conditions such as when the load current of load circuitry 107 increases relatively quickly, the voltage of VOUT drops so significantly, that amplifier 111 cannot lower the voltage of CONT fast enough to raise the voltage of VOUT to keep it within regulation. As shown in FIG. 1, the speed at which the voltage of CONT can be pulled lower is limited by the current IB sunk through path 151 which is set by current source 120. If the voltage of VOUT drops rather quickly, this limitation of sunk current may mean that the voltage of CONT cannot be pulled low fast enough to increase the conductivity of PFET 130 for VOUT to remain in compliance. This may be characterized as the amplifier being in a slewing condition. This may also be characterized as a boost current condition where the amplifier needs additional boost current for a more effective operation.

Accordingly, amplifier 111 includes a boost current path 152, that when enabled by NFET 119 being conductive, provides an additional amount of sunk current (current IB in the embodiment shown) to more quickly pull CONT lower during a sudden drop in voltage of VOUT.

Regulator 101 includes a boost current control circuit for detecting a boost current condition, enabling current path 152 by making NFET 119 conductive, and disabling path 152 after the boost current condition no longer exists. In the embodiment shown, regulator 101 senses when a boost condition is occurring by comparing an indication of a current through PFET 113 as provided by NFET 136 with a reference current IB/N produced by current source 139 in compare current path 126. Based this comparison, the voltage of VCOMP is driven to a voltage level to make NFET 119 conductive to enable boost current path 152.

Regulator 101 includes a current sense path 125 that includes a PFET 131 in a current mirror configuration with PFET 113 such that the current through PFET 113 (as controlled by NFET 115) is also provided though path 125 as current IFB SENSE. Path 125 includes NFET 132 in a diode configuration that provides a voltage at its gate and at the input of low pass filter 144. The voltage at the gate of NFET 132 is indicative of the current IFB SENSE. In the embodiment shown, the delay circuit is implemented as a low pass filter 144 that includes resistor 133 and capacitor 134. However, another type of delay circuit may be implemented in other embodiments (e.g., as a buffer). The delayed and filtered voltage at the output (VLPF) of filter 144 controls the conductivity of NFET 136 to provide current IFB on path 126. During a relatively steady state operation, current IFB is approximately equal to current IFB SENSE such that current IFB is indicative of the current through path 125.

Path 126 acts as a current comparator where the voltage of VCOMP is indicative of whether current IFB is greater than current IB/N. The reference current IB/N is provided by current source 139 and current IFB is provided by NFET 136. If current IFB is a higher, the voltage of VCOMP is pulled towards ground. If current IB/N is higher, then the volage of VCOMP is pulled toward the voltage of VSUP. Under normal conditions, the current flowing through path 124 is approximately IB/2 in that current IB is the sunk current through NFET 116. During normal operation, NFET 136 operates in a triode region. In one embodiment, the reference current (IB/N) is set to a value that is lower than IB/2 (e.g., such as IB/3) so that the voltage of VCOMP is pulled toward ground such that boost current path 152 is not enabled during normal operation.

In one embodiment, utilizing a current path for current comparison in boost current control circuitry may provide for control circuitry that is simpler and faster in its comparison function.

Regulator 101 also includes an assertion circuit 146. As the voltage of VCOMP begins to rise due to a boost current condition (e.g., the load current of circuitry 107 increasing relatively rapidly), circuit 146 causes the voltage of VCOMP to rise to a fully asserted state to turn NFET 119 fully on so as to sink boost current IB through path 152 to increase the speed in which the voltage of CONT is pulled downward. Circuit 146 keeps VCOMP at the high voltage (e.g., the voltage of VSUP) for a period of time to ensure that path 152 is enabled for a sufficient amount of time such that VOUT can remain in regulation during the load current change. In the embodiment shown, circuit 146 includes a high pass filter with capacitor 137 and resistor 138. Circuit 146 also includes a pull down NFET 135 whose drain is connected to the gate of NFET 136 and whose gate is connected to node VHP of the high pass filter of circuit 146. When VCOMP moves to a higher voltage due to a detection of a boost current event, the voltage of node VHP rises to make NFET 135 conductive to pull the gate of NFET 136 to ground which makes NFET 136 non-conductive. With NFET 136 being non-conductive, the voltage of VCOMP is pulled to the voltage of VSUP to fully turn on NFET 119. Asserting NFET 135 removes the output (VLPF) of low pass filter 144 from controlling NFET 136 at this time. NFET 135 remains conductive until capacitor 137 is discharged through resistor 138, at which time NFET 135 becomes nonconductive, where the conductivity of NFET 136 is controlled by VLPF.

Providing an assertion circuit that enables the boost current path (152) for a period of time independent of the current comparison may ensure that the boost current path is fully enabled so that a sufficient amount of boost current will be provided for the amplifier to quickly adjust the amplifier output. Else, the boost current path may not be sufficiently enabled to adjust the voltage of the amplifier output (COMP) in response to a drastic change in load current. In some embodiments, providing a boost current with a period of time independent of the current comparison may ensure the boost current path is fully enabled independent of process, voltage, temperature and current load variations.

Figure 2:
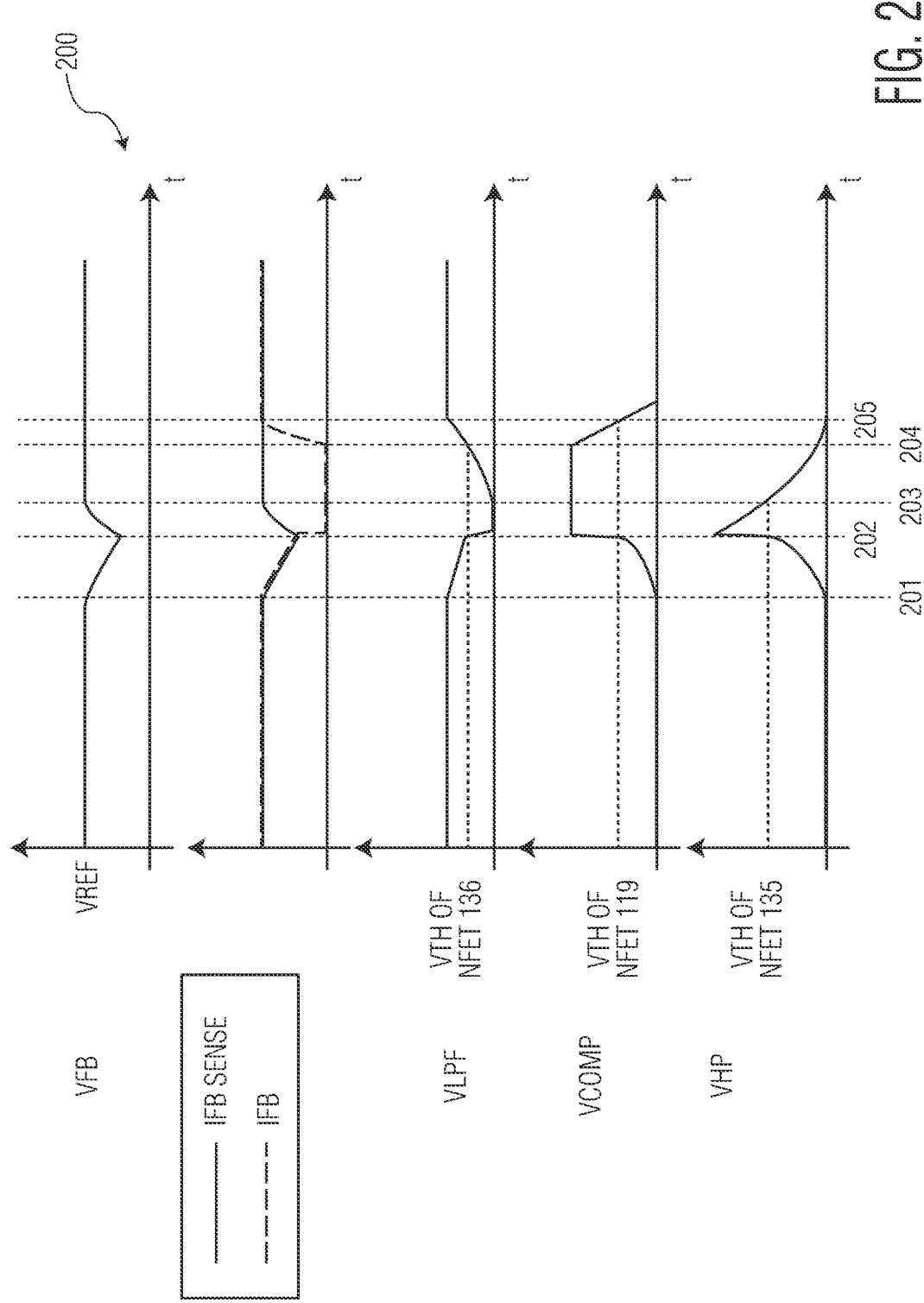
FIG. 2 is a timing diagram showing operations of the circuit of FIG. 1 accordingly to one embodiment of the present invention.

FIG. 2 is a timing diagram showing different voltages and currents of regulator 101 in enabling and disabling the boost current path 152 to provide boost current to node 150 of amplifier 111 during a boost current event as per one embodiment of the present invention.

At the beginning of timing diagram 200, regulator 101 is operating in a normal operating condition where the voltage of VFB is matched to the voltage of VREF and boost current path 152 is disabled. At time 201, a sudden increase in load current by load circuitry 107 occurs causing the voltage of VOUT (not shown) and VFB to drop. As a result of the drop in the voltage of VFB, the current IFB SENSE begins to drop as NFET 115 becomes less conductive, thereby reducing the current through path 124 which also reduces current (IFB SENSE) through sense path 125. The reduction in current IFB SENSE lowers the voltage at the gate of PFET 132 and at the input of low pass filter 144. The voltage of the output of low pass filter 144 (VLPF) decreases with the decreasing voltage of the input of filter 144 to reduce the conductivity NFET 136, which reduces current IFB. At this time, the decrease in current IFB is a delayed slightly from the decrease in current of IFB SENSE by low pass filter 144.

As current IFB falls, the voltage of VCOMP rises as does the voltage of node VHP. When the voltage of node VHP rises above the threshold voltage of NFET 135 at time 202, NFET 135 becomes conductive to pull the gate of NFET 136 (node VLPF) to ground. Pulling the voltage (VLPF) of the gate of NFET 136 to ground makes NFET 136 non-conductive to pull current IFB to zero. Because current IFB is pulled to zero and NFET 136 is non-conductive, the voltage of VCOMP rises rapidly towards VSUB and turns NFET 119 fully on to enable the boost current path 152.

With boost current path 152 enabled, current IB plus the boost current from path 152 being sunk from node 150, which more quickly pulls the CONT signal low to make power PFET 130 more conductive to pull the voltage of VOUT back towards the targeted voltage (as set by VREF) and pulls the voltage of VFB back towards VREF in that amplifier 111 is no longer slewing. Current IFB SENSE also starts rising with the rising voltage of VFB.

In some embodiments (as shown in FIG. 2), providing an assertion circuit 146 that decouples NFET 136 from the control of the low pass filter and sense path 125 at time 202 may enable boost current path 152 to be turned on more quickly in that the voltage of VCOMP is pulled to VSUP and NFET 119 is turned fully on. Otherwise, the increase in current from path 152 may increase the voltage of VLPF above the threshold of NFET 136 to turn on NFET 136 and turn off current path 152 prematurely.

At time 202, the voltage of node VHP spikes due to the increase in voltage of VCOMP from NFET 135 becoming conducive and NFET 136 becoming non-conductive. However, because capacitor 137 and resistor 138 form a high pass filter, the voltage of VHP begins to decrease as charge from capacitor 137 discharges through resistor 138. Sometime afterwards (at time 203), as the voltage of VHP drops below the threshold voltage of NFET 135, NFET 135 becomes non-conductive so that VLPF is no longer tied to ground. The length of time from time 202 (when NFET 135 becomes conductive) to time 203 (when NFET 135 becomes non-conductive) depends upon the voltage of VSUP, the capacitance of capacitor 137, the resistance of resistor 138, and the threshold voltage of NFET 135.

Because node VLPF is no longer tied to ground due to NFET 135 being non-conductive at time 203, the voltage of node VLPF begins to rise as the voltage at the gate of NFET 132 charges capacitor 134 through resistor 133 of low pass filter 144. Because IFB SENSE is rising at this time due to path 152 being enabled, the voltage at the gate of NFET 132 is also rising. Once the voltage of node VLPF rises above the threshold of NFET 136 at time 204, current IFB begins to rise, which begins to pull down the voltage of the VCOMP signal. When the voltage of the VCOMP signal falls below the threshold voltage of NFET 119, NFET 119 becomes non-conductive to disable boost current path 152. At this time, VFB matches VRF and VOUT is at the desired voltage.

Because the gate of NFET 136 is coupled to the gate of NFET 132 through a delay circuit (low pass filter 144), the disablement of boost current path 152 is further delayed from time 204 in that capacitor 134 has to charge through resistor 133. This delay provides additional time for boost current path 152 to be fully enabled to provide boost current for bringing amplifier 111 out of a slewing condition. In the embodiment shown, the amount of delay is dependent upon the capacitance of capacitor 134, the resistance of resistor 133, the voltage of VSUP, and the current change of load circuitry 107 for a particular boost current condition.

Figure 3:
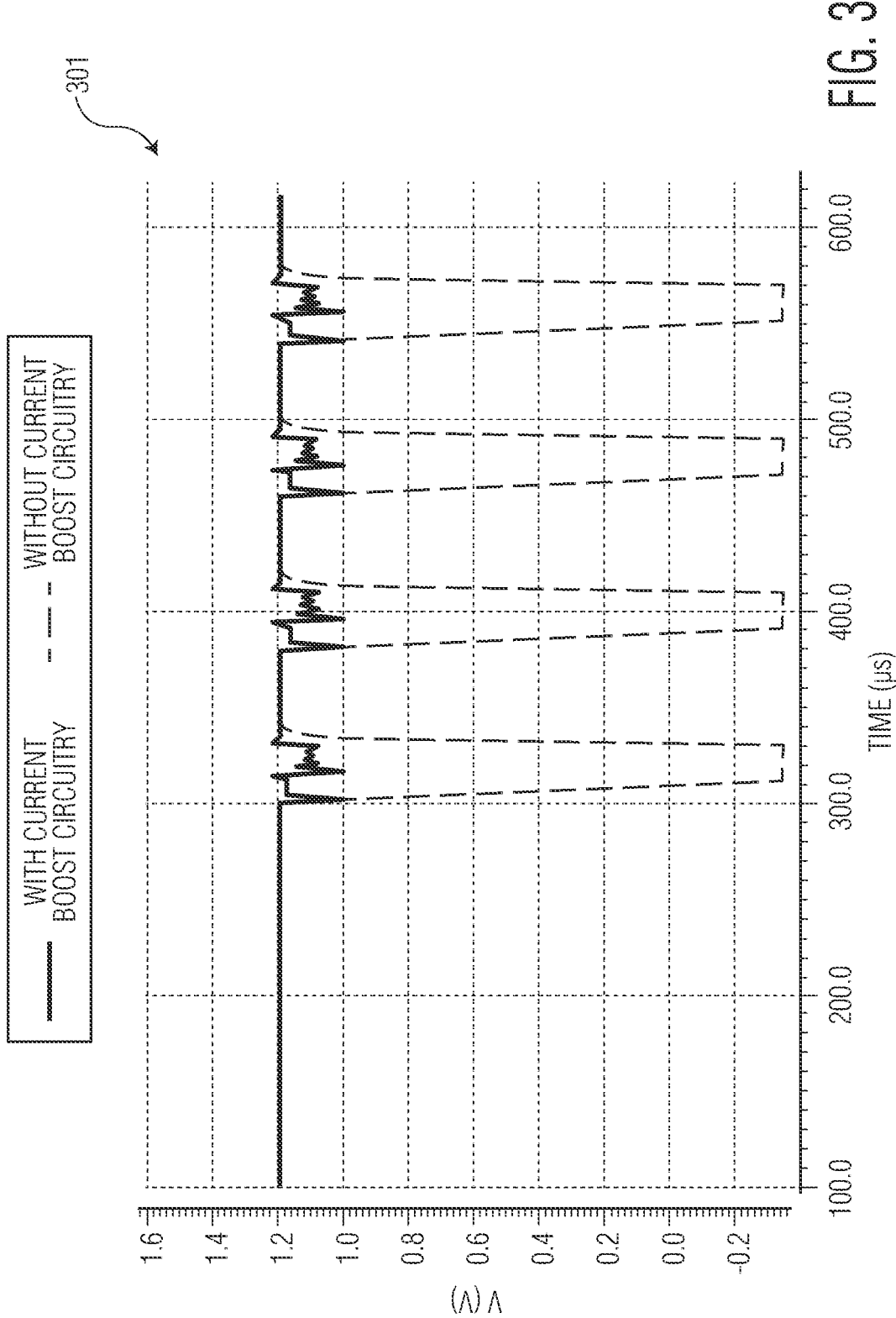
FIG. 3 is a graph illustrating the performance of an embodiment of the present invention.

FIG. 3 is a graph of a simulations of a voltage regulator with boost current circuitry and current comparator control circuitry according to an embodiment of the present invention and simulations of a voltage regulator without boost current circuitry. The simulations show a regulator configured to provide a supply voltage of 1.2V and a DC current load of 5 uA. In the graph, four load step increases of 50 uA. each were applied to the current load. For simulations of the regulator with no boost current circuitry, the voltage dipped by over 1.5V. For simulations of the regulator with boost current circuitry according to one embodiment the present invention, the regulated voltage dropped by only 0.2 V.

A voltage regulator with a boost current circuit and boost current circuit control circuitry may have other implementations in other embodiments. While the circuit of FIG. 1 is shown being implemented with FETs, other embodiments may be at least partially implemented with other types of transistors (e.g., bipolar transistors). In some embodiments, other types of delay circuits (e.g., a buffer) may be used in place of low pass filter 144. In other embodiments, other types of assertions circuits (e.g., a latch) may be used. Some embodiments may not implement an assertion circuit while other embodiments may not implement a delay circuit (low pass filter circuit 144). Also, in other embodiments, other types of switches may be used for NFET 119 and NFET 135. Also, other types of amplifiers and/or comparators may be used in other embodiments. In the embodiment shown, the boost current path is between node 150 and the ground supply voltage terminal. However, in other embodiments, the boost current path is connected to another supply voltage terminal (e.g., VSUP). In one embodiment, the boost current path 152 is connected to the CONT signal line instead of node 150.

A gate is a control terminal for a FET. A source and a drain are both current terminals for a FET.

As shown herein, a voltage regulator includes boost current circuitry that provides additional boost current to an amplifier of a voltage regulator for more quickly responding to boost current conditions such as where a relatively sharp change in current drawn by the load circuitry may drop the load voltage to create a current slewing condition in the amplifier. The boost current control circuitry includes a current comparator for indicating a boost current condition. In some embodiments, the boost current control circuitry includes an assertion circuit for changing the voltage of the switch control signal to more fully turn on the boost current path independent of the current comparison for a period of time. In other embodiments, the boost current control circuitry may include a delay for delaying the disabling of the boost current path as the boost current condition subsides.

In one embodiment, a circuit includes a voltage regulator circuit. The voltage regulator circuit includes an output to provide a regulated voltage and an amplifier. The amplifier includes a first input to receive a reference voltage, a second input to receive a feedback voltage indicative of the regulated voltage, an output to provide a control signal for adjusting the regulated voltage based on a comparison between the first input and the second input, and a boost current path between a node of the amplifier and a supply voltage terminal. The voltage regulator circuit includes a switch to selectively enable and disable the boost current path and a switch control circuit configured to compare a first current indicative of a current of the amplifier and a reference current. The switch control circuit includes an output for selectively controlling the switch to enable or disable the boost current path based on the comparison of the first current and the reference current. The switch control circuit includes an assertion circuit that in response to a detected boost condition based on a comparison between the first current and the reference current, adjusts a voltage of the output of the switch control circuit to enable the boost current path for at least a time independent of a comparison between the reference current and the first current.

In another embodiment, a circuit includes a voltage regulator circuit. The voltage regulator circuit includes an output to provide a regulated voltage and an amplifier. The amplifier includes a first input to receive a reference voltage, a second input to receive a feedback voltage indicative of the regulated voltage, an output to provide a control signal for adjusting the regulated voltage based on a comparison between the first input and the second input, and a boost current path between a node of the amplifier and a supply voltage terminal. The voltage regulator circuit includes a switch to selectively enable and disable the boost current path and a switch control circuit configured to compare a first current indicative of a current of the amplifier and a reference current. The switch control circuit includes an output for selectively controlling the switch to enable or disable the boost current path based on the comparison of the first current and the reference current. The switch control circuit includes a comparison current path including a device to provide the first current in the comparison current path. The switch control circuit includes a delay circuit including an output for providing a voltage indicative of the first current to a control terminal of the device.

In another embodiment, a circuit includes a voltage regulator circuit. The voltage regulator circuit including an output to provide a regulated voltage and an amplifier. The amplifier includes a first input to receive a reference voltage, a second input to receive a feedback voltage indicative of the regulated voltage, an output to provide a control signal for adjusting the regulated voltage based on a comparison between the first input and the second input, and a boost current path between a node of the amplifier and a supply voltage terminal. The voltage regulator circuit includes a switch to selectively enable and disable the boost current path and a switch control circuit configured to compare a first current indicative of a current of the amplifier and a reference current. The switch control circuit includes an output for selectively controlling the switch to enable or disable the boost current path based on the comparison of the first current and the reference current. The switch control circuit includes a comparison current path including a device to provide the first current in the comparison current path for comparing the reference current with the first current. The switch control circuit includes a delay circuit including an output for providing a voltage indicative of the first current to a control terminal of the device. The switch control circuit includes an assertion circuit that in response to a detected boost condition based on a comparison between the first current and the reference current removes control of the voltage of the control terminal of the device by the delay circuit for at least a period of time.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A circuit comprising:
    a voltage regulator circuit, the voltage regulator circuit comprising:
        an output to provide a regulated voltage;
        an amplifier, the amplifier including:
            a first input to receive a reference voltage;
            a second input to receive a feedback voltage indicative of the regulated voltage;
            an output to provide a control signal for adjusting the regulated voltage based on a comparison between the first input and the second input;
            a boost current path between a node of the amplifier and a supply voltage terminal, wherein the regulator circuit includes a switch to selectively enable and disable the boost current path;
        a switch control circuit configured to compare a first current indicative of a current of the amplifier and a reference current, the switch control circuit including an output for selectively controlling the switch to enable or disable the boost current path based on the comparison of the first current and the reference current;
        wherein the switch control circuit includes an assertion circuit that in response to a detected boost condition based on a comparison between the first current and the reference current, adjusts a voltage of the output of the switch control circuit to enable the boost current path for at least a time independent of a comparison between the reference current and the first current.

2. The circuit of claim 1 further comprising a load circuitry, wherein the load circuitry is powered by the output of the voltage regulator circuit, wherein a detected boost condition occurs in response to a relatively fast change in load current drawn by the load circuitry.

3. The circuit of claim 1 wherein the switch control circuit includes a comparison current path including a first device to provide the reference current in the comparison current path and a second device to provide the first current in the comparison current path, wherein the second device has a control terminal, wherein the assertion circuit includes a second switch to bias the control terminal of the second device to a supply terminal in response to a boost condition.

4. The circuit of claim 3 wherein the assertion circuit includes a high pass filter coupled to the output of the switch control circuit, wherein a node of the high pass filter is coupled to a control terminal of the second switch.

5. The circuit of claim 3 wherein an assertion of the second switch places the output of the switch control circuit at a fully asserted state.

6. The circuit of claim 3, wherein after assertion of the second switch, the second switch is de-asserted after a period of time such that a comparison between the first current and the reference current is determinative of the output of the switch control circuit.

7. The circuit of claim 3, wherein the control terminal of the second device receives a voltage indicative of the current of the amplifier.

8. The circuit of claim 1 wherein the switch control circuit includes a comparison current path including a first device to provide the reference current in the comparison current path and a second device to provide the first current in the comparison current path, wherein a control terminal of the second device receives a voltage indicative of the current of the amplifier from a low pass filter.

9. The circuit of claim 1 wherein the switch control circuit includes a comparison current path including a first device to provide the reference current in the comparison current path and a second device to provide the first current in the comparison current path, wherein during a normal operating conduction, the second device operates in triode region, wherein in response to a boost current condition, the second device is made non-conductive.

10. The circuit of claim 1 wherein the amplifier includes a first transistor including a control terminal configured to receive the feedback voltage, wherein the current of the amplifier is a current flowing through a second transistor that is in a current path with the first transistor.

11. A circuit comprising:
a voltage regulator circuit, the voltage regulator circuit comprising:
an output to provide a regulated voltage;
an amplifier, the amplifier including:
a first input to receive a reference voltage;
a second input to receive a feedback voltage indicative of the regulated voltage;
an output to provide a control signal for adjusting the regulated voltage based on a comparison between the first input and the second input;
a boost current path between a node of the amplifier and a supply voltage terminal, wherein the regulator circuit includes a switch to selectively enable and disable the boost current path;
a switch control circuit configured to compare a first current indicative of a current of the amplifier and a reference current, the switch control circuit including an output for selectively controlling the switch to enable or disable the boost current path based on the comparison of the first current and the reference current;
wherein the switch control circuit includes a comparison current path including a device to provide the first current in the comparison current path;
wherein the switch control circuit includes a delay circuit including an output for providing a voltage indicative of the first current to a control terminal of the device.

12. The circuit of claim 11 wherein the delay circuit is characterized as a low pass filter.

13. The circuit of claim 12 wherein the low pass filter includes an input coupled to a node to provide a voltage indicative of the first current, wherein the low pass filter provides a filtered voltage of the voltage indicative of the first current at its output to the control input of the device.

14. The circuit of claim 11 wherein the delay circuit includes an input coupled to a node providing a voltage indicative of the first current, the output for providing a delayed voltage indicative of the first current to the control terminal of the device.

15. The circuit of claim 11 wherein after an enablement of the boost current path in response to a boost current condition, the delay circuit delays a voltage of a node indicative of the first current that indicates that the boost current condition is ending in controlling the conductivity of the device of the comparison current path.

16. The circuit of claim 11 wherein the amplifier includes a first transistor including a control terminal configured to receive the feedback voltage, wherein the current of the amplifier is a current flowing through a second transistor that is in a current path with the first transistor.

17. The circuit of claim 11 further comprising a load circuitry, wherein the load circuitry is powered by the output of the voltage regulator circuit, wherein a detected boost condition that causes an enablement of the boost current path occurs in response to a relatively fast change in load current drawn by the load circuitry.

18. The circuit of claim 11 further comprising an assertion circuit that in response to a detected boost condition based on a comparison between the first current and the reference current removes control of the voltage of the control terminal of the device by the delay circuit for a least a period of time.

19. A circuit comprising:
a voltage regulator circuit, the voltage regulator circuit comprising:
an output to provide a regulated voltage;
an amplifier, the amplifier including:
a first input to receive a reference voltage;
a second input to receive a feedback voltage indicative of the regulated voltage;
an output to provide a control signal for adjusting the regulated voltage based on a comparison between the first input and the second input;
a boost current path between a node of the amplifier and a supply voltage terminal, wherein the regulator circuit includes a switch to selectively enable and disable the boost current path;
a switch control circuit configured to compare a first current indicative of a current of the amplifier and a reference current, the switch control circuit including an output for selectively controlling the switch to enable or disable the boost current path based on the comparison of the first current and the reference current, wherein the switch control circuit includes a comparison current path including a device to provide the first current in the comparison current path for comparing the reference current with the first current;
wherein the switch control circuit includes a delay circuit including an output for providing a voltage indicative of the first current to a control terminal of the device;
wherein the switch control circuit includes an assertion circuit that in response to a detected boost condition based on a comparison between the first current and the reference current removes control of the voltage of the control terminal of the device by the delay circuit for at least a period of time.

20. The circuit of claim 19 further comprising a load circuitry, wherein the load circuitry is powered by the output of the voltage regulator circuit, wherein a detected boost condition occurs in response to a relatively fast change in load current drawn by the load circuitry.

* * * * *